United States Patent
Xu et al.

(10) Patent No.: US 9,131,424 B2
(45) Date of Patent: Sep. 8, 2015

(54) METHOD AND APPARATUS FOR RELEASING USER EQUIPMENT CONTEXT IN WIRELESS COMMUNICATION SYSTEM

(75) Inventors: Jian Xu, Anyang-si (KR); Gene Beck Hahn, Anyang-si (KR); Kyung Min Park, Anyang-si (KR); Jin Sook Ryu, Anyang-si (KR); Sung Hoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 14/001,058

(22) PCT Filed: Mar. 23, 2012

(86) PCT No.: PCT/KR2012/002108
§ 371 (c)(1),
(2), (4) Date: Aug. 22, 2013

(87) PCT Pub. No.: WO2012/134111
PCT Pub. Date: Oct. 4, 2012

(65) Prior Publication Data
US 2014/0010204 A1    Jan. 9, 2014

Related U.S. Application Data

(60) Provisional application No. 61/467,918, filed on Mar. 25, 2011, provisional application No. 61/472,211, filed on Apr. 6, 2011, provisional application No. 61/539,484, filed on Sep. 27, 2011.

(51) Int. Cl.
*H04W 36/38* (2009.01)
*H04W 36/00* (2009.01)
*H04W 84/04* (2009.01)

(52) U.S. Cl.
CPC .......... *H04W 36/38* (2013.01); *H04W 36/0033* (2013.01); *H04W 84/045* (2013.01)

(58) Field of Classification Search
CPC ............ H04W 36/38; H04W 36/0033; H04W 84/045
See application file for complete search history.

(56) References Cited

U.S. PATENT DOCUMENTS

2010/0074129 A1*  3/2010  Wang et al. .................. 370/252
2011/0182244 A1*  7/2011  Liang et al. .................. 370/328
(Continued)

FOREIGN PATENT DOCUMENTS

WO    WO 2010/035971 A2    4/2010
WO    WO 2010/059100 A1    5/2010

OTHER PUBLICATIONS

3GPP TS 36.300, V10.2.0, "3rd Generation Partnership Project; Technical Specification Group Radio Access Network; Evolved Universal Terrestrial Radio Access (E-UTRA) and Evolved Universal Terrestrial Radio Access Network(E-UTRAN); Overall Description; Stage 2, (Release 10)", p. 1-200, Dec. 18, 2010.

(Continued)

*Primary Examiner* — Clemence Han
(74) *Attorney, Agent, or Firm* — Birch, Stewart, Kolasch & Birch, LLP

(57) ABSTRACT

A method and apparatus for releasing a user equipment (DUE) context in a wireless communication system is provided. A home evolved NodeB (HeNB) gateway (GW)/X2-proxy receives a UE context release message, forwards the UE context release message to a source eNB; and releasing the UE context of the corresponding UE. The source eNB and the target eNB may be connected through an indirect X2 interface. Or, a home evolved NodeB (HeNB) gateway (GW)/X2-proxy receives a UE context release request message from a source eNB, and releases the UE context of the corresponding UE based on the UE context release request message. The source eNB and the target eNB may be connected through a direct X2 interface.

12 Claims, 13 Drawing Sheets

(56) References Cited

U.S. PATENT DOCUMENTS

2011/0286429 A1* 11/2011 Vikberg et al. ............... 370/331
2012/0190368 A1* 7/2012 Zhang et al. .................. 455/436

OTHER PUBLICATIONS

3GPP TSG-RAN WG3 Meeting #69, R3-103261, "X2 Mobility via HeNB GW Proxy" Nokia Seimens Network, pp. 1-5, Aug. 23-27, 2010, Madrid, Spain.

3GPP TSG-RAN WG3 Meeting RAN3#69bis, R3-102823 "X2 Mobility Aspects with HeNB GW Proxy", Nokia Seimens Networks, pp. 1-5, Oct. 11-15, 2010, Xi'an, China.

3GPP TS 36.300 version 10.2.0 Release 10, "Evolved Universal Terrestrial Radio Access (E-UTRA) and Evolved Universal Terrestrial Radio Access Network (E-UTRAN); Overall description; Stage 2", Technical Specification, Jan. 1, 2011, 200 pages, XP014062136.

Huawei: "UE Context Release in the Source HeNB GW", 3GPP TSG-RAN3 Meeting #70b, R3-110108, Jan. 11, 2011, 6 pages, XP050474852.

* cited by examiner (a)

(b)

METHOD AND APPARATUS FOR RELEASING USER EQUIPMENT CONTEXT IN WIRELESS COMMUNICATION SYSTEM

This application is the National Phase of PCT/KR2012/002108 filed Mar. 23, 2012, which claims priority under 35 U.S.C. 119(e) to the U.S. Provisional Application Nos. 61/467,918 filed Mar. 25, 2011, 61/472,211 filed Apr. 6, 2011 and 61/539,484 filed Sep. 27, 2011, all which are hereby expressly incorporated by reference into the present application.

TECHNICAL FIELD

The present invention relates to wireless communication, and more particularly, to a method and apparatus for releasing a user equipment (UE) context in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The specification of a home eNB (HeNB) is currently ongoing in 3GPP LTE. It may be referred to Paragraph 4.6.1 of "Technical Specification Group Radio Access Network; Evolved Universal Terrestrial Radio Access (E-UTRA); and Evolved Universal Terrestrial Radio Access Network (E-UTRAN); Overall description; Stage 2 (release 9)" to 3GPP (3rd generation partnership project) TS 36.300 V10.2.0 (2010-12). The HeNB is a small base station designed for use in residential or small business environment. The HeNB may be a femto cell or a pico cell. The HeNB is short range about tens of meter, installed by the consumer for better indoor voice and data reception.

FIG. 5 shows logical architecture of an E-UTRAN HeNB.

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

FIG. 6 shows overall architecture with deployed HeNB GW.

Referring to FIG. 6, an E-UTRAN may include one or more eNB 60, one or more HeNB 70 and a HeNB GW 79. One or more E-UTRAN MME/S-GW 69 may be positioned at the end of the network and connected to an external network. The one or more eNB 60 may be connected to each other through the X2 interface. The one or more eNB 60 may be connected to the MME/S-GW 69 through the S1 interface. The HeNB GW 79 may be connected to the MME/S-GW 69 through the S1 interface. The one or more HeNB 70 may be connected to the HeNB GW 79 through the S1 interface or may be connected to the MME/S-GW 69 through the S1 interface. Or, the one or more HeNB 70 may be connected to the MME/S-GW 69 through the S5 interface.

The one or more HeNB 70 may be connected to each other through the X2 interface. In this case, the one or more HeNB 70 have same closed subscriber group (CSG) IDs. That is, the X2 interface may be established between the HeNBs having the same CSG IDs. If the X2 interface between HeNBs exists, a X2-based handover procedure may be performed through the X2 interface.

FIG. 7A and FIG. 7B show an example of an intra-MME/S-GW handover procedure.

In E-UTRAN, network-controlled UE-assisted handovers may be performed in RRC_CONNECTED state. Part of the handover command comes from the target eNB and is transparently forwarded to the UE by the source eNB. To prepare the handover procedure, the source eNB passes all necessary information to the target eNB (e.g. E-RAB attributes and RRC context). When a carrier aggregation (CA) is configured and to enable seconday cell (SCell) selection in the target eNB, the source eNB can provide in decreasing order of radio quality a list of the best cells. Both the source eNB and the UE keep some context (e.g. C-RNTI) to enable the return of the UE in case of handover procedure failure. The UE accesses the target cell via a random access channel (RACH) following a contention-free procedure using a dedicated RACH preamble or following a contention-based procedure if dedicated RACH preambles are not available. If the RACH procedure towards the target cell is not successful within a certain time, the UE initiates radio link failure recovery using the best cell.

The preparation and execution phase of the handover procedure is performed without evolved packet core (EPC) involvement. It means that preparation messages are directly exchanged between the eNBs. The release of the resources at the source side during the handover completion phase is triggered by the eNB.

First, the handover preparation procedure is described.

0. Area restriction information is provided. The UE context within the source eNB contains information regarding roaming restrictions which where provided either at connection establishment or at the last timing advance (TA) update.

1. The source eNB configures the UE measurement procedures according to the area restriction information, and transmits a measurement control message to the UE through L3 signaling. Measurements provided by the source eNB may assist the function controlling the UE's connection mobility. Meanwhile, the packet data is exchanged between the UE and the source eNB, or between the source eNB and the serving gateway.

2. The UE transmits measurement reports by the rules set by i.e. system information, specification etc to the source eNB through L3 signaling.

3. The source eNB makes handover decision based on the measurement reports and radio resource management (RRM) information.

4. The source eNB transmits a handover request message through L3 signaling to the target eNB passing necessary information to prepare the handover procedure at the target side. UE X2/UE S1 signaling references enable the target eNB to address the source eNB and the EPC. The evolved radio access bearer (E-RAB) context includes necessary radio network layer (RNL) and transport network layer (TNL) addressing information, and quality of service (QoS) profiles of the E-RABs.

In the case of a UE under an RN performing handover procedure, the handover request message is received by the DeNB, which reads the target cell ID from the message, finds the target eNB corresponding to the target cell ID, and forwards the X2 message toward the target eNB.

In the case of a UE performing handover procedure toward an RN, the handover request is received by the DeNB, which reads the target cell ID from the message, finds the target RN corresponding to the target cell ID, and forwards the X2 message toward the target RN.

5. The target eNB performs admission control. The admission control may be performed dependent on the received E-RAB QoS information to increase the likelihood of a successful handover, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB transmits a handover request acknowledge message to the source eNB through L3 signaling, and prepares the handover. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the source eNB receives the handover request acknowledge message, or as soon as the transmission of the handover command is initiated in the downlink, data forwarding may be initiated.

7. The target eNB transmits an RRC connection reconfiguration message including mobility control information to perform the handover, to be sent by the source eNB to the UE. The source eNB performs the necessary integrity protection and ciphering of the message. The UE receives the RRC connection reconfiguration message with necessary parameters. The UE is commanded by the source eNB to perform the handover procedure. The UE does not need to delay the handover execution for delivering the hybrid automatic repeat request (HARQ)/automatic repeat request (ARQ) responses to the source eNB.

Hereafter, the handover execution procedure will be described.

The UE detaches from old cell and synchronizes to new cell. In addition, the source eNB delivers buffered and in-transit packets to the target eNB.

8. The source eNB transmits a serial number (SN) status transfer message to the target eNB to convey the uplink packet data convergence protocol (PDCP) SN receiver status and the downlink PDCP SN transmitter status of E-RABs for which PDCP status preservation applies. The uplink PDCP SN receiver status may include at least the PDCP SN of the first missing UL SDU and a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRC connection reconfiguration message including the mobility control information, the UE performs synchronization to the target eNB and access the target cell via RACH. The access to the target cell via the RACH may be a contention-free procedure if a dedicated RACH preamble was indicated in the mobility control information. Or, the access to the target cell via RACH may be a contention-based procedure if no dedicated preamble was indicated. The UE derives target eNB specific keys and configures the selected security algorithms to be used in the target cell.

10. The target eNB responds to the synchronization of the UE with UL allocation and timing advance.

11. When the UE has successfully accessed the target cell, the UE transmits an RRC connection reconfiguration complete message (C-RNTI) to confirm the handover procedure, along with an uplink buffer status report, whenever possible, to the target eNB to indicate that the handover procedure is completed for the UE. The target eNB verifies the C-RNTI sent in the RRC connection reconfiguration complete message. The target eNB can now begin transmitting data to the UE. The packet data is exchanged between the UE and the target eNB.

Hereafter, the handover completion procedure will be described.

12. The target eNB transmits a path switch request message to MME to inform that the UE has changed cell.

13. The MME transmits a user plane update request message to a serving gateway (S-GW).

14. The S-GW switches the downlink data path to the target side. The S-GW transmits one or more end marker packets on the old path to the source eNB and then can release any U-plane/TNL resources towards the source eNB.

15. The S-GW transmits a user plane update response message to MME.

16. The MME transmits a path switch acknowledge message to the target eNB to confirm the path switch request message.

17. The target eNB transmits a UE context release message to the source eNB to inform success of the handover procedure and trigger the release of resources by the source eNB.

18. When the UE context release message is received, the source eNB can release radio and C-plane related resources associated to the UE context. Any ongoing data forwarding may continue.

When an X2-based handover is used between HeNBs and when the source HeNB is connected to a HeNB GW, an S1 UE context release request message including an explicit GW context release indication is transmitted by the source HeNB, in order to indicate that the HeNB GW may release of all the resources related to the UE context.

The handover procedure may be performed between a HeNB and a macro eNB. That is, a UE may want to be handed over from the HeNB to the macro eNB, or from the macro eNB to the HeNB. When the handover procedure is performed between the HeNB and the macro eNB, more efficient way to release the UE context is required.

SUMMARY OF INVENTION

Technical Problem

The present invention provides a method and apparatus for releasing a user equipment (UE) context in a wireless communication system.

Solution to Problem

In an aspect, a method for releasing a user equipment (UE) context, by a home evolved NodeB (HeNB) gateway (GW)/X2-proxy, in a wireless communication system is provided. The method includes receiving a first UE context release message from a target eNB, forwarding the first UE context release message to a source eNB, and releasing the UE context of the corresponding UE, wherein the source eNB and the target eNB are connected through an indirect X2 interface.

The UE context of the corresponding UE may be released after receiving the first UE context release message from the target eNB, and the first UE context release message to the source eNB may be forwarded after releasing the UE context of the corresponding UE.

The UE context of the corresponding UE may be released based on the first UE context release message.

The first UE context release message may include an information element or a cause value indicating UE context release.

The method may further includes receiving a second UE context release message from the source eNB, wherein the UE context of the corresponding UE may be released by the HeNB GW/X2-proxy after receiving the second UE context release message from the source eNB.

The UE context of the corresponding UE may be released based on the second UE context release message.

The second UE context release message may include an information element or a cause value indicating UE context release.

The UE context of the corresponding UE may include at least one of an S1 related UE context and an X2 related UE context.

The source eNB may be an HeNB and the target eNB may be a macro eNB, or the source eNB may be a macro eNB and the target eNB may be an HeNB.

In another aspect, a method for releasing a user equipment (UE) context, by a home evolved NodeB (HeNB) gateway (GW)/X2-proxy, in a wireless communication system is provided. The method includes receiving a UE context release request message from a source eNB, and releasing the UE context of the corresponding UE based on the UE context release request message, wherein the source eNB and the target eNB are connected through a direct X2 interface.

The UE context release request message may include an information element or a cause value indicating UE context release.

The UE context of the corresponding UE may include at least one of an S1 related UE context and an X2 related UE context.

The source eNB may be an HeNB and the target eNB may be a macro eNB, or the source eNB may be a macro eNB and the target eNB may be an HeNB.

Advantageous Effects of Invention

A signaling overhead can be reduced for the UE context release.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 8:
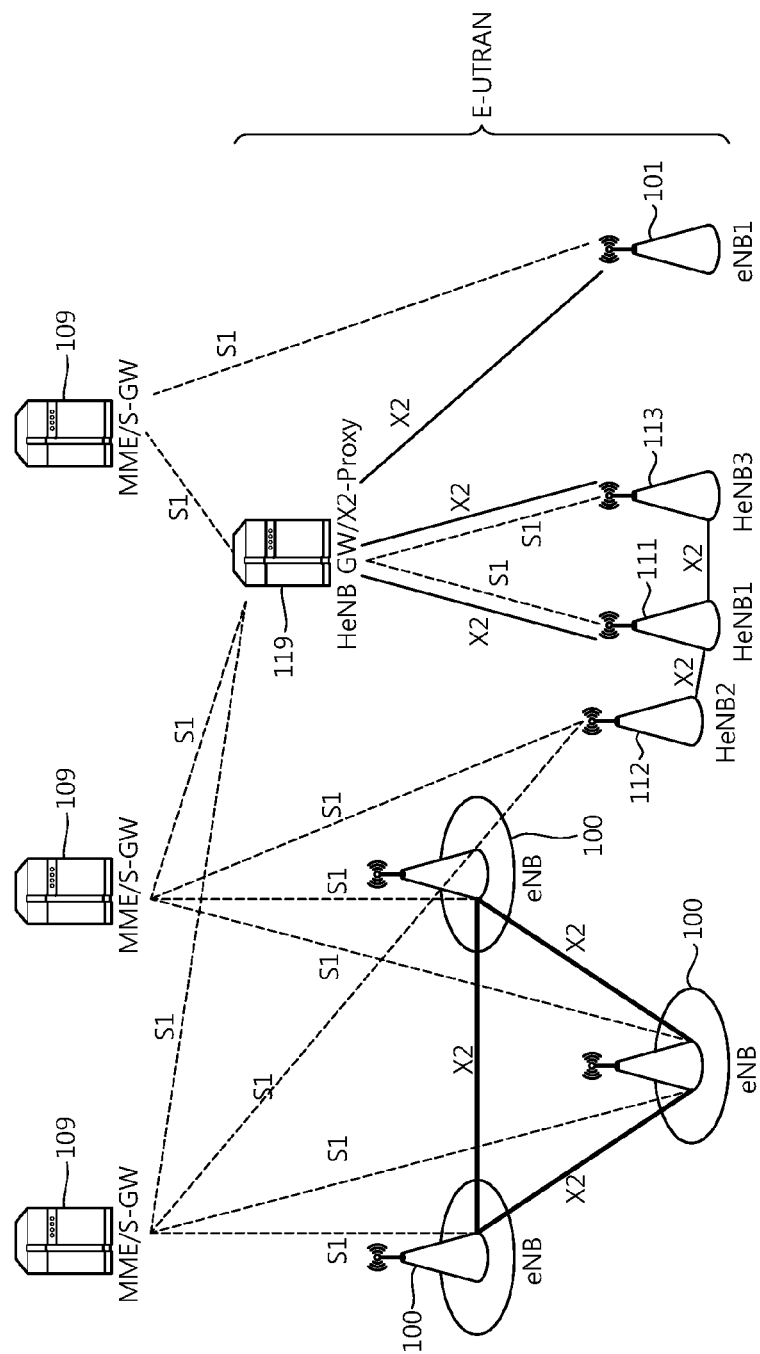
FIG. 8 shows overall E-UTRAN architecture with deployed HeNB GW or X2-proxy GW according to an embodiment of the present invention.

FIG. 8 shows overall E-UTRAN architecture with deployed HeNB GW or X2-proxy GW according to an embodiment of the present invention.

Referring to FIG. 8, an E-UTRAN may include one or more eNB 100, macro eNB1 101, HeNB1 111, HeNB2 112, HeNB3 113 and a HeNB GW/X2-proxy 119. One or more E-UTRAN MME/S-GW 109 may be positioned at the end of the network and connected to an external network. The eNBs 100 may be connected to each other through the X2 interface. The eNBs 100 may be connected to the MME/S-GW 109 through the S1 interface. The HeNB GW/X2-proxy 119 may be connected to the MME/S-GW 109 through the S1 interface. The HeNB1 111 and the HeNB3 113 may be connected to the HeNB GW/X2-proxy 119 through the S1 interface. The HeNB2 112 may be connected to the MME/S-GW 109 through the S1 interface.

The HeNBs 111, 112, 113 may be connected to each other through the direct X2 interface. In this case, the HeNBs 111, 112, 113 may have same CSG IDs. Or, the HeNBs 111, 112, 113 may have different CSG IDs. The macro eNB1 101 may be connected to the MME/S-GW 109 through the S1 interface. The macro eNB1 101 may be connected to the HeNBs 111, 113 through the indirect X2 interface. The indirect X2 interface between the macro eNB1 101 and the HeNBs 111, 113 goes through the HeNB GW/X2-proxy 119. The HeNB GW/X2-proxy 119 may be a HeNB GW having an X2-proxy functionality for supporting the X2 interface. Hereinafter, if the indirect X2 interface goes through the HeNB GW, the HeNB GW may be referred as the HeNB GW/X2-proxy.

Figure 9:
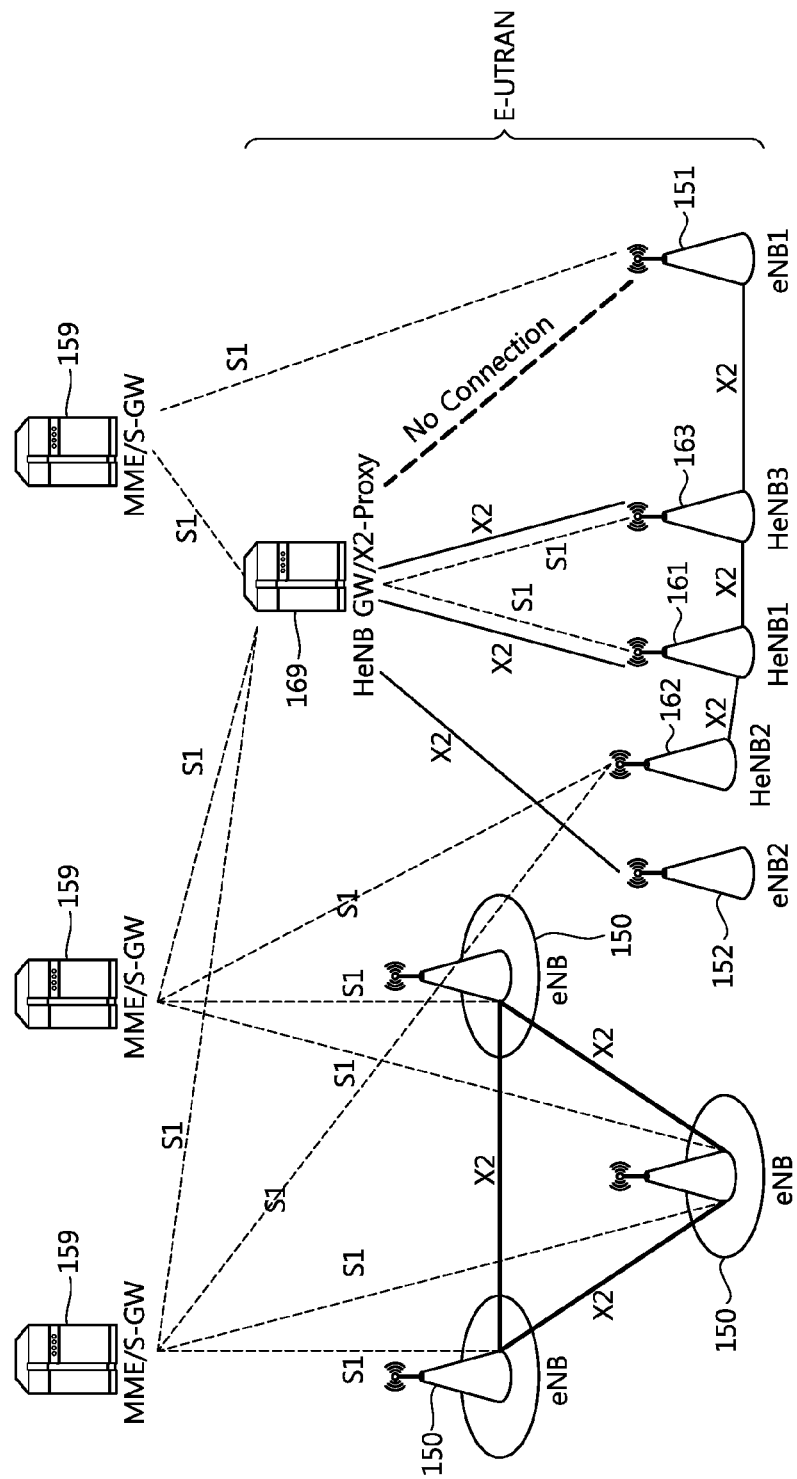
FIG. 9 shows another overall E-UTRAN architecture with deployed HeNB GW or X2-proxy GW according to an embodiment of the present invention.

FIG. 9 shows another overall E-UTRAN architecture with deployed HeNB GW or X2-proxy GW according to an embodiment of the present invention.

Referring to FIG. 9, an E-UTRAN may include one or more eNB 150, macro eNB1 151, macro eNB2 152, HeNB1 161, HeNB2 162, HeNB3 163 and a HeNB GW/X2-proxy 169. One or more E-UTRAN MME/S-GW 159 may be positioned at the end of the network and connected to an external network. The eNBs 150 may be connected to each other through the X2 interface. The eNBs 100 may be connected to the MME/S-GW 159 through the S1 interface. The HeNB GW/X2-proxy 169 may be connected to the MME/S-GW 159 through the S1 interface. The HeNB1 161 and the HeNB3 163 may be connected to the HeNB GW/X2-proxy 169 through the S1 interface. The HeNB2 162 may be connected to the MME/S-GW 159 through the S1 interface.

The HeNBs 161, 162, 163 may be connected to each other through the direct X2 interface. In this case, the HeNBs 161, 162, 163 may have same CSG IDs. Or, the HeNBs 161, 162, 163 may have different CSG IDs. The macro eNB1 151 may be connected to the MME/S-GW 159 through the S1 interface. The macro eNB1 151 may be connected to the HeNB3 163 through the direct X2 interface. There is no connection between the macro eNB1 151 and the HeNB GW/X2-proxy 169. The macro eNB2 152 may be connected to the HeNB GW 169 through the X2 interface.

Based on the direct or indirect X2 interface between the HeNB and the macro eNB as described in FIG. 8 and FIG. 9, the X2-based handover can be preceded more quickly between the HeNB and the macro eNB.

When the X2-based handover is performed between the HeNB and the macro eNB, a signaling process waste problem may occur when a UE context is released by the convention method. It is assumed that the HeNB3 113 and the macro eNB1 101 is connected through the indirect X2 interface going through the HeNB GW/X2-proxy 119. Also, it is assumed that one UE served by the HeNB3 113 wants to be handed over to the macro eNB1 101. The handover from the HeNB to the macro eNB may be referred as an outbound handover. After the target macro eNB1 101 receives a path switch request acknowledge message from the MME, the target macro eNB1 101 transmits a UE context release message to the source HeNB3 113 through X2 interface, which goes through the HeNB GW/X2-proxy 119 since there is no direct X2 interface between the macro eNB1 101 and the HeNB3 113. When the source HeNB3 113 receives the UE context release message, the source HeNB3 113 transmits an S1 UE context release request message including an explicit GW context release indication to its serving HeNB GW/X2-proxy 119.

Figure 1:
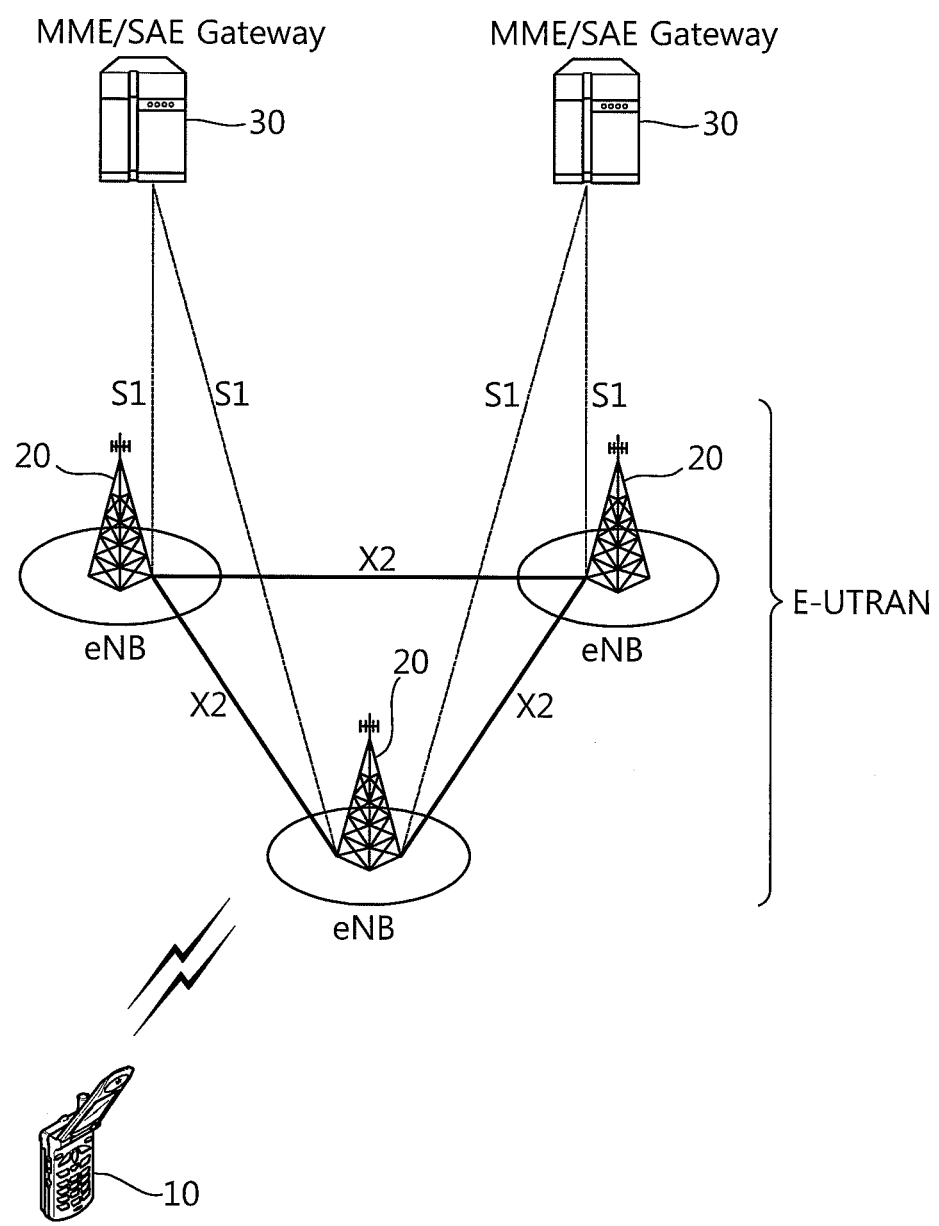
FIG. 1 shows network structure of an evolved universal mobile telecommunication system (E-UMTS).
Figure 2:
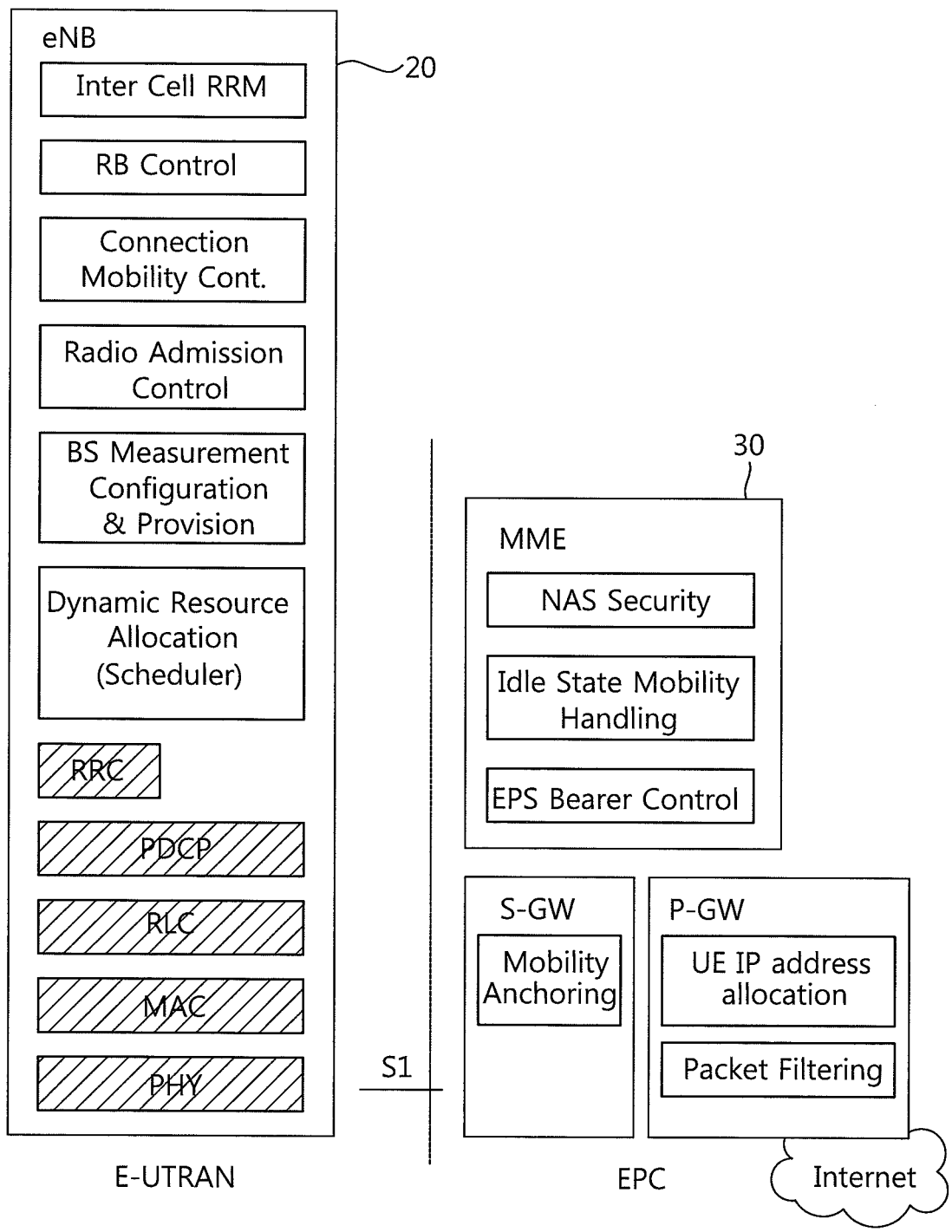
FIG. 2 shows architecture of a typical E-UTRAN and a typical EPC.
Figure 3:
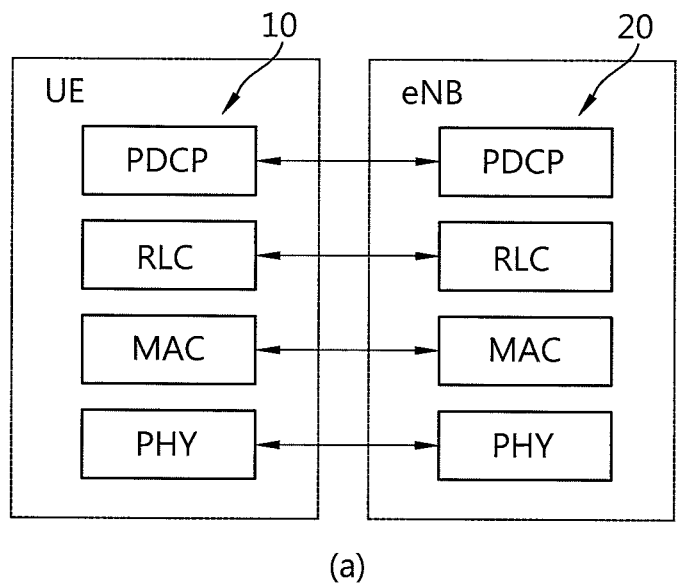
FIG. 3 shows a user-plane protocol and a control-plane protocol stack for the E-UMTS.
Figure 3:
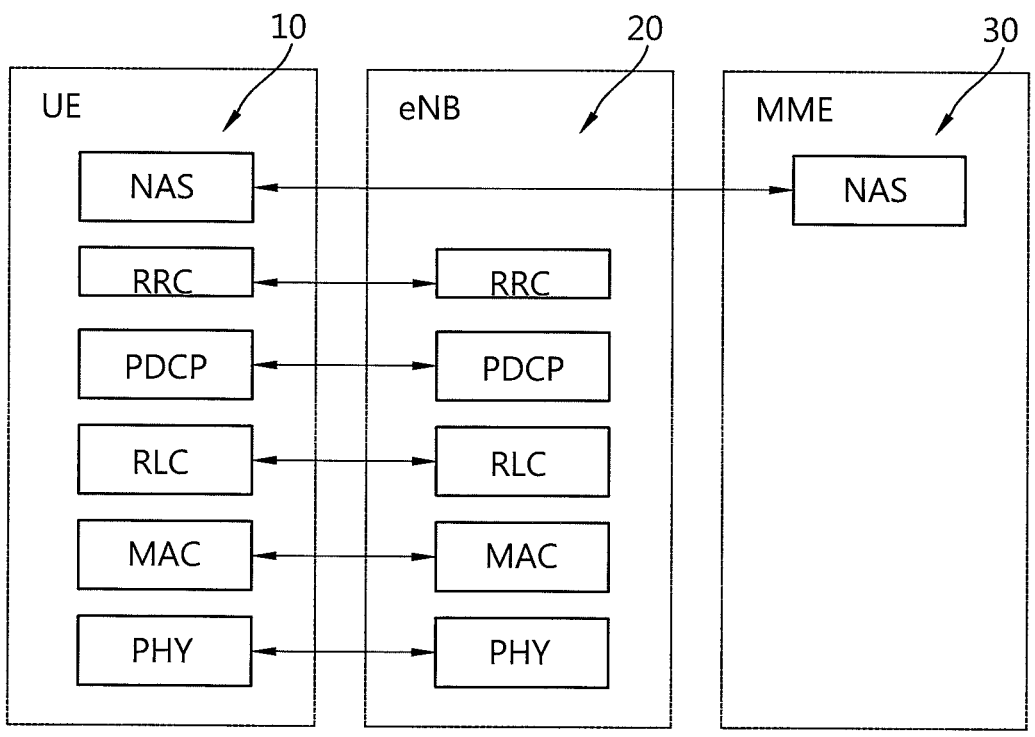
Figure 4:
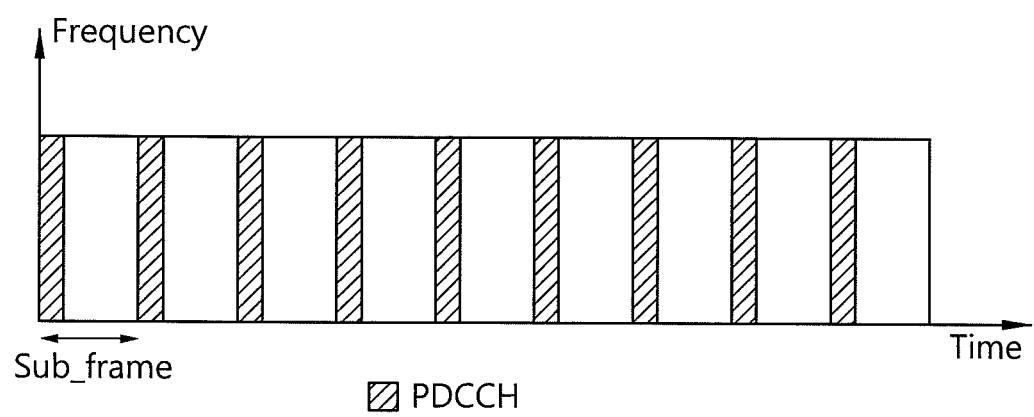
FIG. 4 shows an example of structure of a physical channel.
Figure 5:
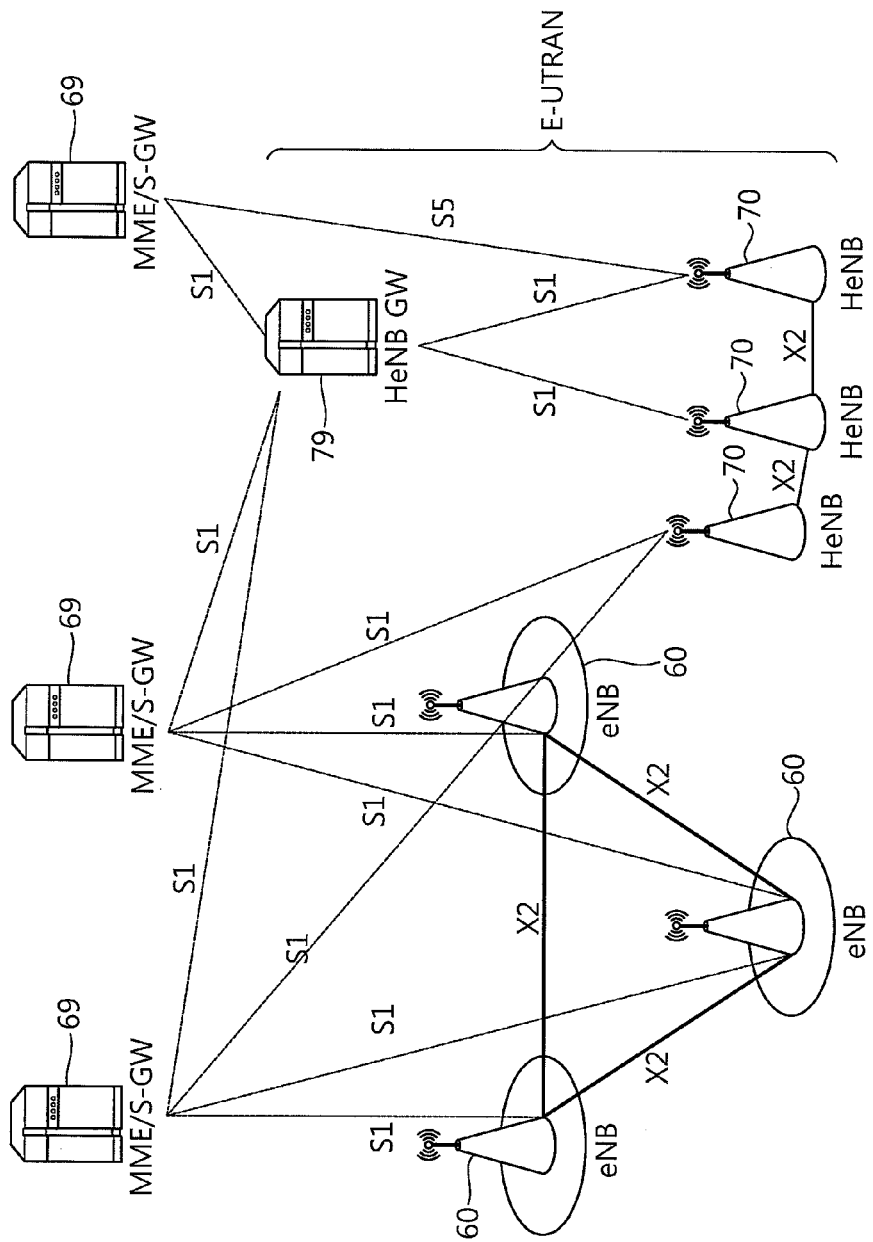
FIG. 5 shows logical architecture of an E-UTRAN HeNB.
Figure 6:
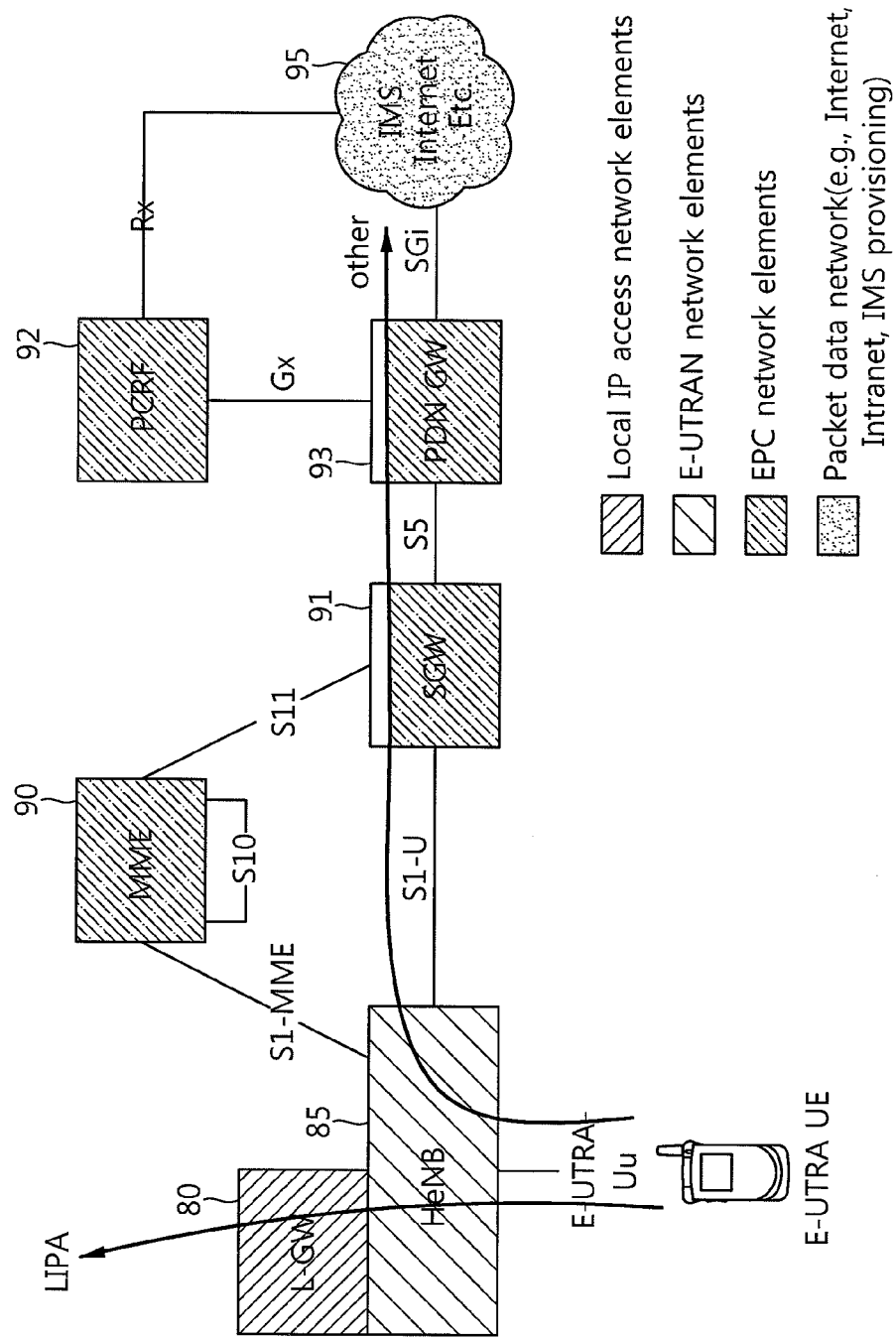
FIG. 6 shows overall architecture with deployed HeNB GW.
Figure 7A:
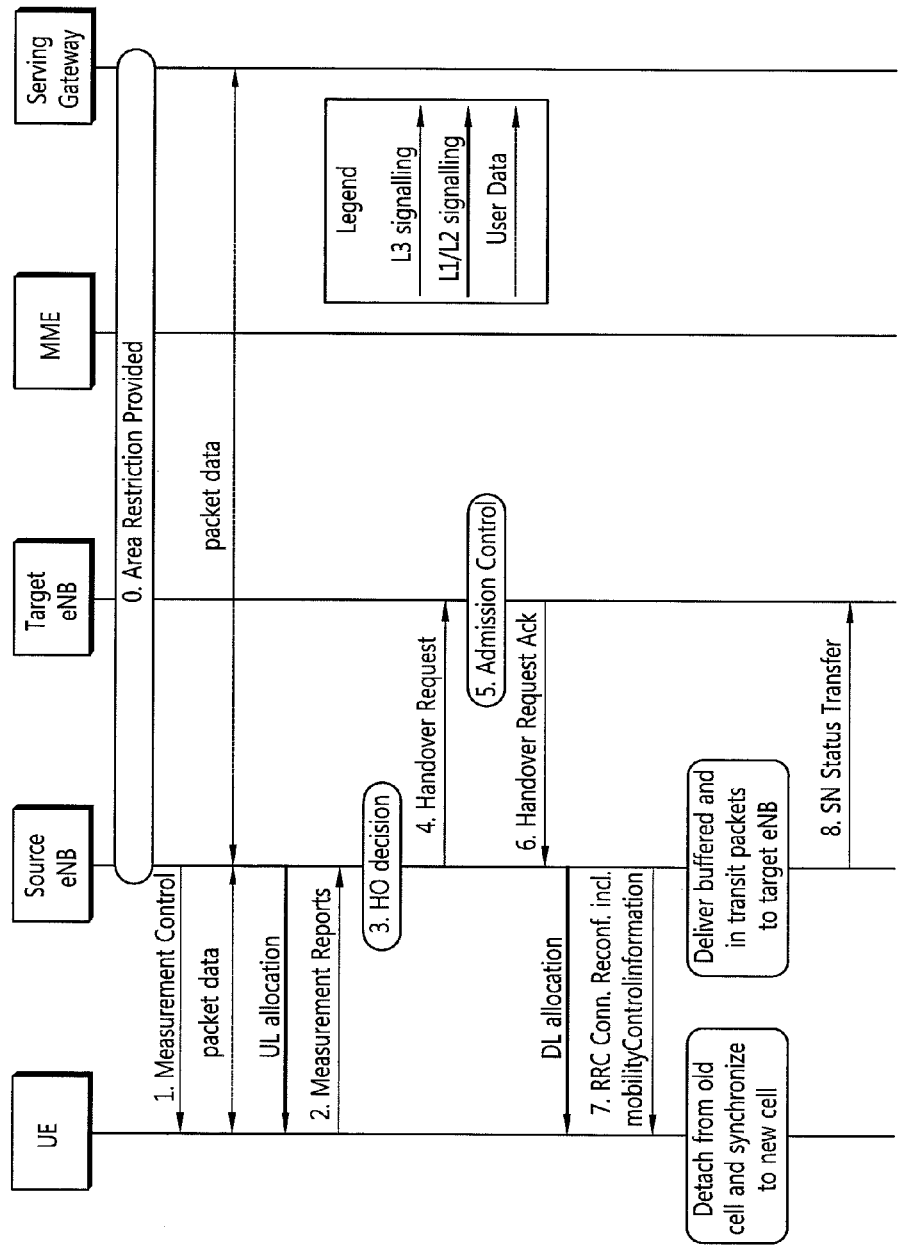
FIG. 7A and FIG. 7B show an example of an intra-MME/S-GW handover procedure.
Figure 7B:
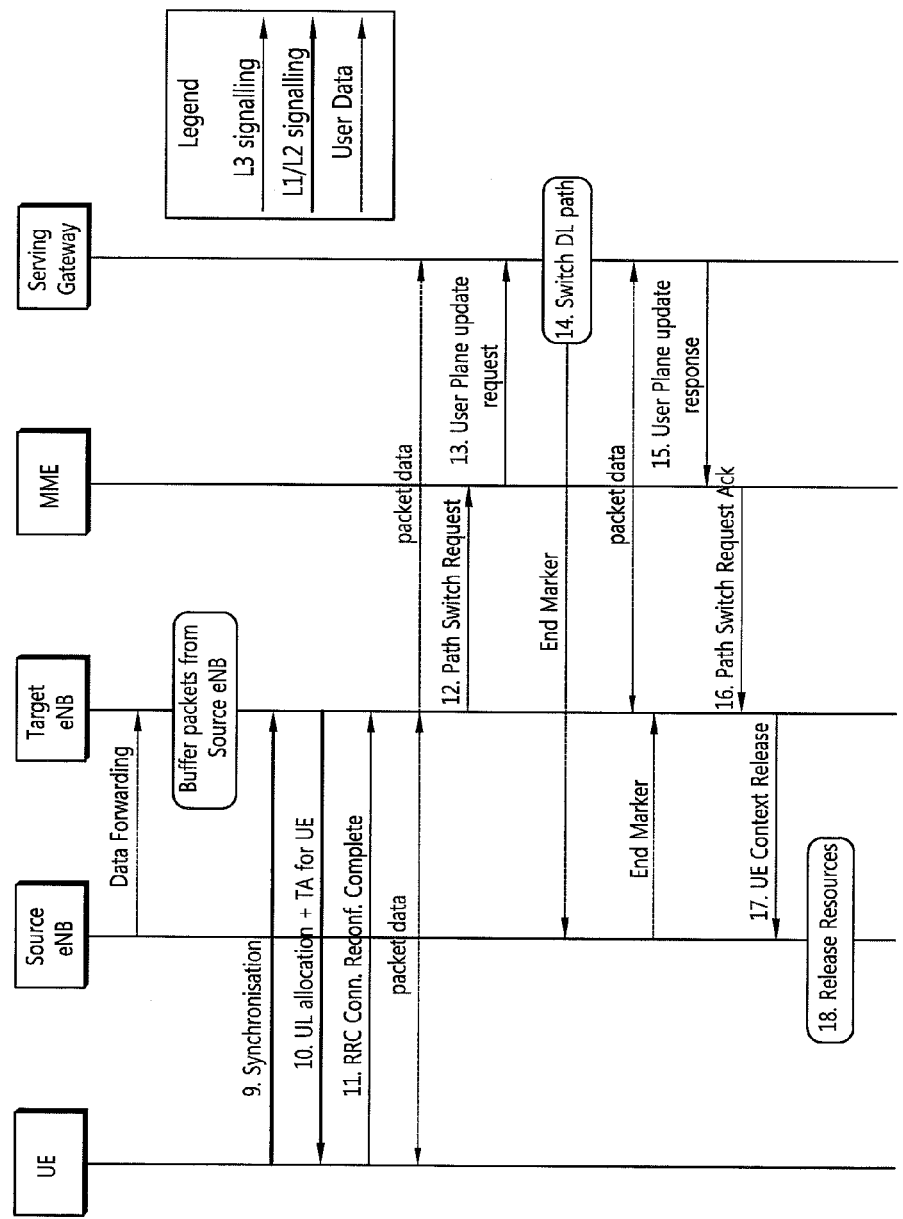

In this scenario, there exists the signaling process waste problem if the conventional X2 handover UE context release procedure is applied. The procedure mentioned above is designed for the conventional overall architecture with deployed HeNB GW as described in FIG. 6, in which the X2 interface between the HeNB and the HeNB GW does not exist. However, as described in FIG. 8, the X2 interface between the HeNB and the HeNB GW may exist especially for the mobility between the macro eNB and the HeNB. Thus, it can be seen that the signaling waste problem exists for UE context release when the HeNB GW receives the UE context release message from the target macro eNB and forwards it to the source HeNB.

Similarly, the signaling waste problem mentioned above may occur when one UE served by the macro eNB1 101 wants to be handed over to the HeNB3 113. The handover from the macro eNB to the HeNB may be referred as an inbound handover. In this case, when the target HeNB3 113 transmits the UE context release message to the HeNB GW/X2-proxy 119, the HeNB GW/X2-proxy 119 forwards the UE context release message to the source macro eNB1 101. As described above, the same signaling waste problem may occur.

To solve the problem described above, the UE context release method below may be proposed.

Figure 10:
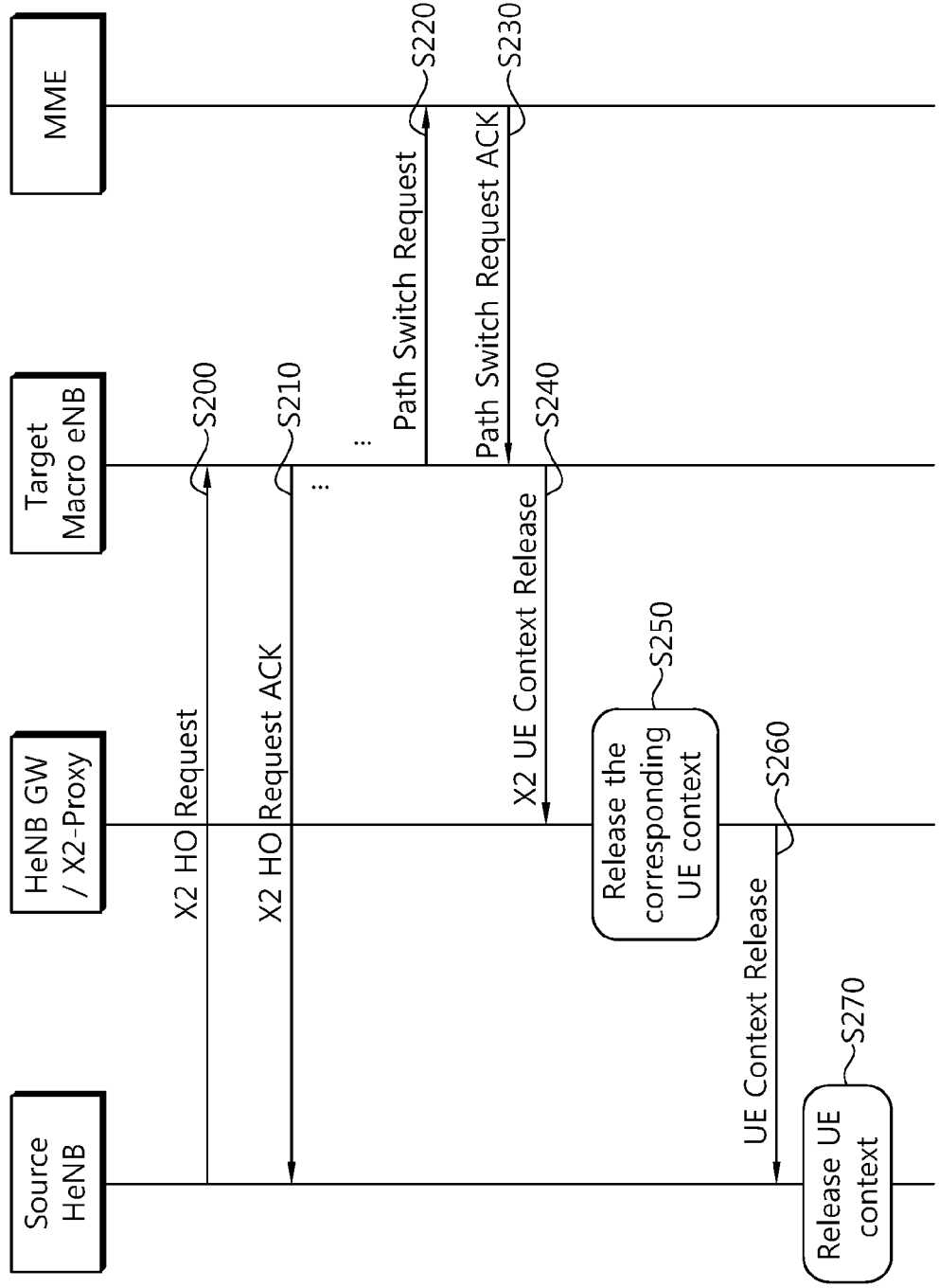
FIG. 10 shows an example of the proposed UE context release method when an indirect X2 interface is established between the HeNB and the macro eNB.

FIG. 10 shows an example of the proposed UE context release method when an indirect X2 interface is established between the HeNB and the macro eNB. The proposed UE context release method described in FIG. 10 can be applied in case of the outbound handover.

In step S200, a source HeNB transmits an X2 handover request message to a target macro eNB. In Step S210, the target macro eNB transmits an X2 handover request acknowledge message to the source HeNB. In step S220, the target macro eNB transmits a path switch request message to an MME. In step S230, the MME transmits a path switch request acknowledge message to the target macro eNB.

In step S240, the target macro eNB transmits an X2 UE context release message to the HeNB GW/X2-proxy through the X2 interface. In step S250, when the HeNB GW/X2-proxy receives the X2 UE context release message, the HeNB GW/X2-proxy checks the X2 UE context release message and finds the corresponding UE. The HeNB GW/X2-proxy releases a UE context of the corresponding UE. For example, the UE context of the corresponding UE may be eNB UE X2 AP ID, MME UE S1 AP ID, etc.

In step S260, the HeNB GW/X2-proxy forwards the UE context release message to the source HeNB. In step S270, upon reception of the UE context release message, the source HeNB may release radio and C-plane related resources associated to the UE context. Accordingly, an S1 UE context release request message is not necessary to be transmitted to the HeNB GW.

The UE context release message is transmitted by the target eNB to the source HeNB to indicate that resources can be released. Table 1 shows an example of the UE context release message according to the present invention.

TABLE 1

| IE/Group Name | Presence | Range | IE type and reference | Semantics description | Criticality | Assigned Criticality |
| --- | --- | --- | --- | --- | --- | --- |
| Message Type | M | | 9.2.13 | | YES | ignore |
| Old eNB UE X2AP ID | M | | eNB UE X2AP ID 9.2.24 | Allocated at the source eNB | YES | reject |
| New eNB UE X2AP ID | M | | eNB UE X2AP ID 9.2.24 | Allocated at the target eNB | YES | reject |
| Context release indication | O | | 9.2.y.y | | YES | ignore |

In table 1, a context release indication information element (IE) is newly added. The context release indication IE indicates the context which should be released by the HeNB GW. Table 2 shows an example of the context release indication IE included in the UE context release message according to the present invention.

TABLE 2

| IE/Group Name | Presence | Range | IE type and reference | Semantics description |
|---|---|---|---|---|
| Context release indication | M | | ENUMERATED (S1 AP related UE context, X2 AP related UE context, all the UE context) | |

Or, the UE context release message may use a cause value instead of the new context release indication IE. The corresponding cause value needs to be revised so that it has explicit meaning of the UE context release indication. Table 3 shows another example of the UE context release message according to the present invention.

TABLE 3

| IE/Group Name | Presence | Range | IE type and reference | Semantics description | Criticality | Assigned Criticality |
|---|---|---|---|---|---|---|
| Message Type | M | | 9.2.13 | | YES | ignore |
| Old eNB UE X2AP ID | M | | eNB UE X2AP ID 9.2.24 | Allocated at the source eNB | YES | reject |
| New eNB UE X2AP ID | M | | eNB UE X2AP ID 9.2.24 | Allocated at the target eNB | YES | reject |
| Cause value | O | | 9.2.6 | | YES | ignore |

In table 3, the UE context release message includes the cause value. The cause value may indicate UE context release indication.

Similar procedure may be performed in case of the inbound handover. That is, when the HeNB GW/X2-proxy receives the X2 UE context release message through X2 interface from the target HeNB, it checks the X2 UE context release message and finds the corresponding UE. The HeNB GW/X2-proxy releases the UE context of the corresponding UE. The HeNB GW/X2-proxy forwards the UE context release message to the source macro eNB. Upon reception of the UE context release message, the source macro eNB may release radio and C-plane related resources associated to the UE context.

Figure 11:
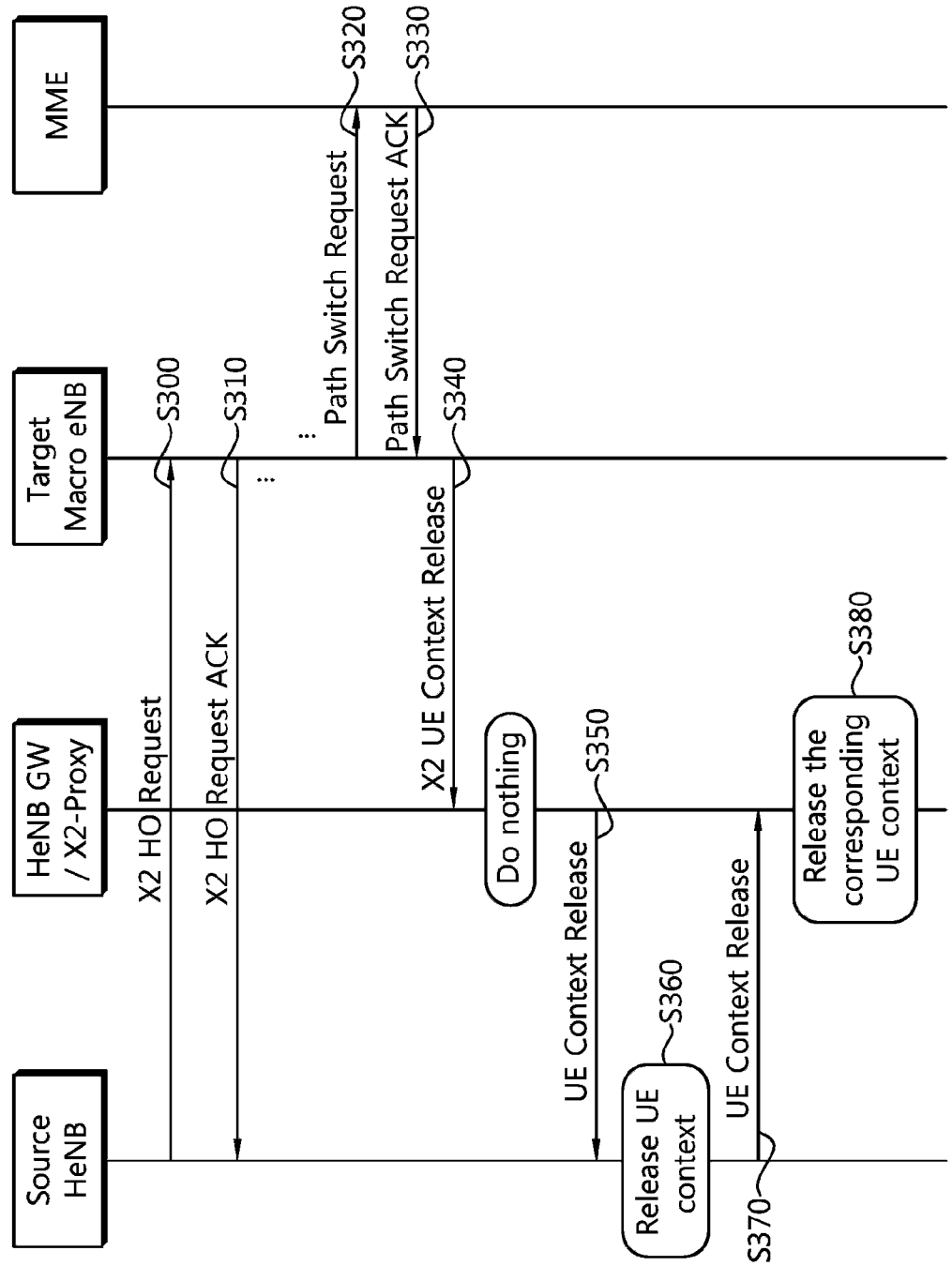
FIG. 11 shows another example of the proposed UE context release method when an indirect X2 interface is established between the HeNB and the macro eNB.

FIG. 11 shows another example of the proposed UE context release method when an indirect X2 interface is established between the HeNB and the macro eNB. The proposed UE context release method described in FIG. 11 can be applied in case of the outbound handover.

It is possible to realize the UE context release by using the conventional UE context release method with some modification.

In step S300, a source HeNB transmits an X2 handover request message to a target macro eNB. In Step S310, the target macro eNB transmits an X2 handover request acknowledge message to the source HeNB. In step S320, the target macro eNB transmits a path switch request message to an MME. In step S330, the MME transmits a path switch request acknowledge message to the target macro eNB.

In step S340, the target macro eNB transmits an X2 UE context release message to the HeNB GW/X2-proxy through the X2 interface. In step S350, the HeNB GW/X2-proxy just forwards the received UE context release message to the source HeNB. In step S360, on reception of the X2 UE context release message from the HeNB GW/X2-proxy, the source HeNB may release radio and C-plane related resources associated to the UE context.

In step S370, the source HeNB transmits a UE context release message to the HeNB GW/X2-proxy instead of transmitting an S1 UE context release request message to the HeNB GW/X2-proxy. In step S380, on reception of the UE context release message from the source HeNB, the HeNB GW/X2-proxy releases the UE context of the corresponding UE.

The UE context release message may include the UE context release indication. The UE context release message may include newly added context release indication IE as described in table 1, or the UE context release message may include a cause value indicating the UE context release indication as described in table 3.

According to the UE context release procedure mentioned above, the S1 message is reduced as more as possible.

Figure 12:
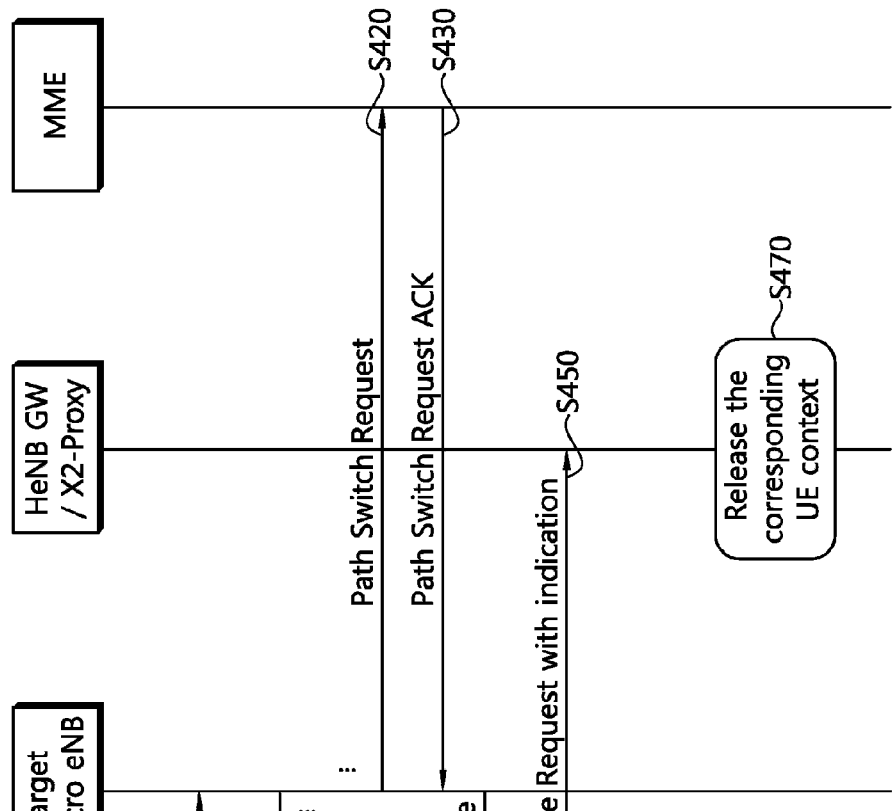
FIG. 12 shows an example of the proposed UE context release method when a direct X2 interface is established between the HeNB and the macro eNB.

FIG. 12 shows an example of the proposed UE context release method when a direct X2 interface is established between the HeNB and the macro eNB.

It is important to notify the HeNB GW the proper UE context release. For example, when the direct X2 interface exists between the HeNB and the macro eNB, the source HeNB notifies the HeNB GW by transmitting a UE context release request message through the S1 interface in order to notify the HeNB GW to release the UE context. That is the conventional release procedure. In this scenario, there is no problem to release the entire UE context including both S1 and X2 related UE context. The reason is that the UE is not under the source HeNB GW. However, when the direct X2 interface does not exist between the HeNB and the macro eNB, problem occurs if the source HeNB transmits the same message to the HeNB GW. The reason is that HeNB GW has to release only the S1 related UE context (MME UE S1 AP ID and eNB UE S1 AP ID) while the X2 related UE context cannot be released since the UE is still under the HeNB GW.

Based on the X2 setup procedure done before, the source HeNB knows whether it has direct connection with the target macro eNB or not. Thus, the UE context release method is proposed in order to notify the HeNB GW to release the corresponding UE context properly.

In step S400, a source HeNB transmits an X2 handover request message to a target macro eNB. In Step S410, the target macro eNB transmits an X2 handover request acknowledge message to the source HeNB. In step S420, the target macro eNB transmits a path switch request message to an MME. In step S430, the MME transmits a path switch request acknowledge message to the target macro eNB.

In step S440, the target macro eNB transmits an X2 UE context release message to the source HeNB through the X2 interface. When the source HeNB supporting CSG (open mode, hybrid mode or closed mode) receives the UE context release message, the source HeNB checks whether the direct X2 interface to the target macro eNB exists or not. If the direct X2 interface to the target macro eNB exists, the source HeNB transmits a UE context release request message through the S1 interface or a UE context release message through the X2 interface to the HeNB GW with indication of releasing the UE context in step S450. In step S460, the source HeNB may release radio and C-plane related resources associated to the UE context. When the HeNB GW receives the UE context release request message or the UE context release message, the HeNB GW would read the indication and release the corresponding UE context in step S470. The corresponding UE context may be an S1 related UE context, or an X2 related UE context. Or, the corresponding UE context may include both S1 and X2 related UE context.

If the direct X2 interface to the target macro eNB does not exist, the UE context release procedure may conform the proposed UE context release procedure described in FIGS. 10 and 11.

The UE context release request message is a message transmitted by the eNB to request the release of the UE-associated S1-logical connection over the S1 interface. For the UE context release purpose of the present invention, the UE context release request message may be updated. The UE context release request message may include newly added IE. Table 4 shows an example of the UE context release request message according to the present invention.

Figure 13:
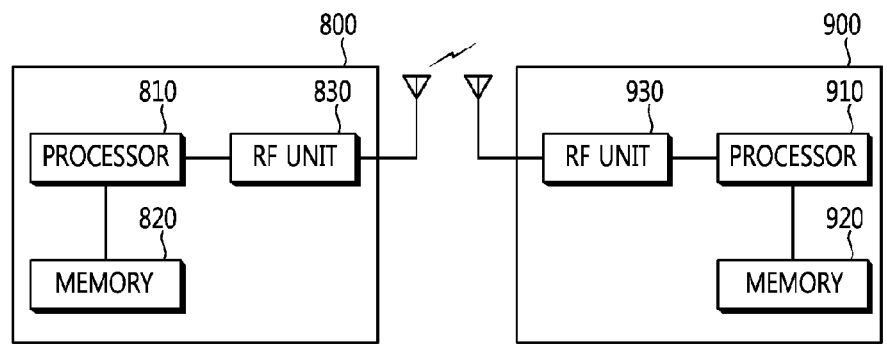
FIG. 13 is a block diagram showing wireless communication system to implement an embodiment of the present invention.

FIG. 13 is a block diagram showing wireless communication system to implement an embodiment of the present invention.

An eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A HeNB GW 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| Cause | M | | 9.2.1.3 | | YES | ignore |
| Context release indication | O | | 9.x.z.z | | YES | ignore |

In table 4, a context release indication IE is newly added. The context release indication IE indicates the context which should be released by the HeNB GW. Table 5 shows an example of the context release indication IE included in the UE context release request message according to the present invention.

TABLE 5

| IE/Group Name | Presence | Range | IE type and reference | Semantics description |
|---|---|---|---|---|
| Context release indication | M | | ENUMERATED (S1 AP related UE context, X2 AP related UE context, all the UE context) | |

Or, the UE context release request message may use a cause value instead of the new context release indication IE. The corresponding cause value needs to be revised so that it has explicit meaning of the UE context release indication.

disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for releasing a user equipment (UE) context, by a home evolved NodeB (HeNB) gateway (GW)/X2-proxy, in a wireless communication system, the method comprising:
   receiving a first UE context release message from a target eNB;
   forwarding the first UE context release message to a source eNB; and
   releasing the UE context of the corresponding UE,
   wherein the source eNB and the target eNB are connected through an indirect X2 interface.

2. The method of claim 1, wherein the UE context of the corresponding UE is released after receiving the first UE context release message from the target eNB, and
   the first UE context release message to the source eNB is forwarded after releasing the UE context of the corresponding UE.

3. The method of claim 2, wherein the UE context of the corresponding UE is released based on the first UE context release message.

4. The method of claim 3, wherein the first UE context release message includes an information element or a cause value indicating UE context release.

5. The method of claim 1, further comprising receiving a second UE context release message from the source eNB,
   wherein the UE context of the corresponding UE is released by the HeNB GW/X2-proxy after receiving the second UE context release message from the source eNB.

6. The method of claim 5, wherein the UE context of the corresponding UE is released based on the second UE context release message.

7. The method of claim 6, wherein the second UE context release message includes an information element or a cause value indicating UE context release.

8. The method of claim 1, wherein the UE context of the corresponding UE includes at least one of an S1 related UE context and an X2 related UE context.

9. The method of claim 1, wherein the source eNB is an HeNB and the target eNB is a macro eNB, or
   the source eNB is a macro eNB and the target eNB is an HeNB.

10. A method for releasing a user equipment (UE) context, by a home evolved NodeB (HeNB) gateway (GW)/X2-proxy, in a wireless communication system, the method comprising:
    receiving a UE context release request message from a source eNB; and
    releasing the UE context of the corresponding UE based on the UE context release request message,
    wherein the source eNB and a target eNB are connected through a direct X2 interface, and
    wherein the source eNB is an HeNB and the target eNB is a macro eNB, or the source eNB is a macro eNB and the target eNB is an HeNB.

11. The method of claim 10, wherein the UE context release request message includes an information element or a cause value indicating UE context release.

12. The method of claim 10, wherein the UE context of the corresponding UE includes at least one of an S1 related UE context and an X2 related UE context.

* * * * *